United States Patent
Yamamoto et al.

(10) Patent No.: US 6,726,593 B2
(45) Date of Patent: Apr. 27, 2004

(54) CONTROL DEVICE FOR CONTROLLING FRONT AND REAR WHEEL DRIVE VEHICLE

(75) Inventors: Akihiro Yamamoto, Saitama (JP); Takahiro Yonekura, Saitama (JP); Tomohiro Nishi, Saitama (JP); Tetsu Sugiyama, Saitama (JP); Yusuke Tatara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,795

(22) Filed: Nov. 6, 2001

(65) Prior Publication Data

US 2002/0058565 A1 May 16, 2002

(30) Foreign Application Priority Data

Nov. 10, 2000 (JP) .................................... P2000-343086

(51) Int. Cl.⁷ .......................... B60K 41/02; B60K 1/00; B60K 6/00
(52) U.S. Cl. ................... 477/5; 477/6; 477/8; 477/168; 477/176; 180/65.2
(58) Field of Search .............................. 477/5, 6, 8, 13, 477/168, 176, 169, 180; 180/65.2, 65.3

(56) References Cited

U.S. PATENT DOCUMENTS

| | | | |
|---|---|---|---|
| 5,856,709 A | * | 1/1999 | Ibaraki et al. ............... 290/45 |
| 5,982,045 A | * | 11/1999 | Tabata et al. ................ 290/17 |
| 5,984,034 A | | 11/1999 | Morisawa et al. ......... 180/65.2 |
| 6,183,389 B1 | * | 2/2001 | Tabata ........................... 477/5 |
| 6,199,650 B1 | * | 3/2001 | Masberg et al. ............ 180/197 |
| 6,364,807 B1 | * | 4/2002 | Koneda et al. ................ 477/5 |
| 6,428,444 B1 | * | 8/2002 | Tabata ........................... 477/3 |

FOREIGN PATENT DOCUMENTS

| | | | | |
|---|---|---|---|---|
| DE | 199 50 567 A1 | 5/2000 | | |
| DE | 199 53 587 A1 | 5/2000 | | |
| JP | 2000166023 | * | 6/2000 | ............ B60L/11/14 |

* cited by examiner

*Primary Examiner*—Tisha D. Lewis
(74) *Attorney, Agent, or Firm*—Armstrong, Kratz, Quintos, Hanson & Brooks, LLP

(57) ABSTRACT

A vehicle control device for front and rear wheel drive vehicles, which have one wheel pair driven with an engine and the other pair driven with an electrical motor, and a torque converter with a lock-up mechanism controlling the engagement amount, has a lock-up control means changing the target slip amount to be set in accordance with driving conditions, a motor drive power setting means which sets the drive power distribution ratio of the motor and a compensation means which compensates the target slip amount according to the drive power distribution ratio set by the motor drive power setting means. The control device enables the setting of the optimum slip ratio of the torque converter to improve the fuel consumption, avoiding problems associated with: noise and vibration during the motor assisting.

2 Claims, 4 Drawing Sheets

CONTROL DEVICE FOR CONTROLLING FRONT AND REAR WHEEL DRIVE VEHICLE

FIELD OF THE INVENTION

The present invention relates to a control device for a front and rear wheel drive vehicle and, more particularly, to a control device for a front and rear wheel drive vehicle, in which one of front and rear wheel pairs is driven with an engine and the other one of the front and rear wheel pairs is driven with an electric motor, and on which a torque converter with a lock-up mechanism is mounted.

BACKGROUND OF THE INVENTION

In recent years, extensive research and development works have been undertaken to provide a front and rear wheel drive vehicle wherein one of front and rear wheel pairs is driven with an engine and the other one of the front and rear wheel pairs is driven with an electric motor. The front and rear wheel drive vehicle is a vehicle which serves as a hybrid vehicle having a low fuel consumption and which serves as a four-wheel drive vehicle having a running through performance.

In general, the front and rear wheel drive vehicle includes a battery that stores electric power to be supplied to the electric motor, and an electric power generator that charges the battery. In a case where the electric motor, which drives the wheels, serves as the electric power generator, the electric motor regenerates a portion of the running energy of the vehicle as an electrical energy, i.e., a regenerative power which is charged into the battery. Usually, the electric motor functions to produce regenerative power during a decelerating condition of the vehicle wherein an accelerator pedal is not depressed. However, in an event that a state of charge of the battery is below a given level, a forced charging operation is carried out even when the accelerator pedal is depressed. During regenerative operation of the electric motor, also, a brake force is applied to the wheels associated with the electric motor on account of its regenerative operation.

In the vehicle equipped with an automatic transmission the fuel efficiency is deteriorated. This is because the torque converter rotates turbine blades by creating oil flow with pump blades rotated by engine drive power, causing a loss of engine output due to the hydraulic friction. Some converters have a lock-up mechanism, which gives a direct connection between the pump side and the turbine side so that the number of revolutions is approximately the same for the both sides. The lock-up mechanism automatically changes the oil flow in the torque converter when the vehicle speed reaches a predetermined speed or more and presses the lock-up clutch mounted on turbine blades to the front cover of pump blades, thereby rotating the turbine blades and pump blades uniformly.

However, when the engine torque is great such as the case where the engine revolution is in a low revolution region, if the slip ratio of the torque converter is set as 100% by controlling the engagement amount of the lock-up clutch, the vibration of an engine will be transferred to a vehicle. The slip ratio of the torque converter is defined as 100% when the lock-up clutch is in a complete direct connection. The transfer of vibration is reduced by slipping the lock-up clutch in such a manner that the slip ratio is reduced from 100% according to the driving state of the vehicle. In the case of the vehicle driven only by the engine, the slip ratio of the torque converter is mapped with the vehicle speed, the throttle opening degree and the like, with which the slip ratio is controlled by adjusting the engagement amount of the lock-up clutch.

SUMMARY OF THE INVENTION

However, when said vehicle is equipped with the automatic transmission which has the torque converter with the lock-up mechanism, the closer to 100% the slip ratio of the torque converter is set by controlling the engagement amount of the lock-up clutch, the more will arise the problems associated with NV (Noise Vibration) caused by surging and booming noise during the motor assist mode. Therefore, the transmission loss (namely the loss of engine output) of this vehicle will increase, deteriorating the fuel economy according as the slip ratio of the torque converter is decreased from 100%.

It is therefore an object of the present invention to provide a control device for a front and rear wheel drive vehicle for setting the optimum slip ratio of the torque converter to improve the fuel consumption, avoiding the problems associated with NV during the motor assist mode.

According to the present invention to address the above issues, there is provided a control device for a front and rear wheel drive vehicle, in which one of front and rear wheel pairs is driven with an engine and the other one of front and rear wheel pairs is driven with an electrical motor, and a torque converter with a lock-up mechanism capable of controlling the engagement amount is disposed between said engine and said one of wheel pairs, the control device comprising:

a lock-up control means for controlling said lock-up mechanism so that the target slip amount is set in accordance with driving conditions of said front and rear wheel drive vehicle;

a motor drive power setting means which sets the drive power of said motor;

a compensation means which compensates said target slip amount according to the motor drive power set by said motor drive power setting means.

With this control device for the front and rear wheel drive vehicle, the compensation means compensates the target slip amount during the assistance with the motor drive power. The engagement amount of the lock-up mechanism is increased with the compensation to decrease the slip amount of the converter. When the vehicle is in a starting operation etc., the torque is amplified for the engine drive power by the torque converter, whereas no amplification of the torque is required if there is an assistance with the motor drive power. Therefore, it will not create problems associated with NV even if the slip amount of the torque converter is decreased, as the vibration and noise of the engine decrease during the motor assistance.

According to said control device for the front and rear wheel drive vehicle, said compensation means has the characteristics that said slip amount is controlled so that the number of revolutions and the drive power of said engine do not fall in a certain driving region of said engine.

This control device for the front and rear drive vehicle solves the NV problem by the compensation means, which provides the setting of the optimum slip amount within the range where the relation between the number of engine revolutions and engine drive power do not fall in a given driving region of the engine (surging region, booming noise region and the like).

The driving conditions indicate conditions in regard with running of the front and rear wheel drive vehicle, such as vehicle speed, throttle opening degree and engine torque. And the engine drive power indicates the power associated with the engine in regard with the throttle opening degree or the engine torque etc. And the given driving region of the engine means a problematic driving region related to NV such as surging region and booming noise region etc., which is defined with the number of engine revolutions and the engine drive power depending on the engine characteristics and the like. In addition, the meaning of restricting the compensation of target slip amount is that a maximum number is set for the slip amount to be compensated when the target slip ratio is compensated.

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENTS

To describe the present invention more in detail, a preferred embodiment of a control device for a front and rear wheel drive vehicle according to the present invention will be described below in detail with reference to the drawings.

Advanced features of the control device for the front and rear wheel drive vehicle according to the present invention improves the fuel consumption by reducing the transmission loss of the torque converter with the compensation of the target slip amount of the torque converter by the compensation means during the motor assist mode. Furthermore, this control device will solve the noise and vibration problems with the compensation means by setting a maximum limit for the compensation of target slip amount within the range, in which the relation of the number of engine revolutions and the engine drive power does not fall in the surging region, booming noise region or the like.

In the illustrated embodiment of the present invention, the front and rear wheel drive vehicle to which the control device of the present invention is applied will be described with reference to a front and rear wheel drive vehicle wherein a front wheel pair is driven with an engine and a rear wheel pair is driven with a motor. The front and rear wheel drive vehicle is equipped with the automatic transmission, which has the torque converter with the lock-up clutch. Further, in the control device of the front and rear wheel drive vehicle, the target slip ratio is additionally compensated according to the motor drive power during the motor drive power assist mode. The control device gives the maximum additional compensation to the target slip ratio, avoiding the surging region and booming noise region, which are governed by the number of engine revolutions and the engine torque. In the illustrated embodiment, the driving state of the front and rear wheel drive vehicle defined in appended claims refers to the vehicle speed and the throttle opening degree. And also in the illustrated embodiment, the slip amount defined in appended claims refers to the slip ratio of the torque converter. This slip ratio of the torque converter is defined in such a manner that the lock-up clutch is in a complete connection for the slip ratio of 100% and the slip ratio decreases from 100% with the reduction in the engagement.

Figure 1:
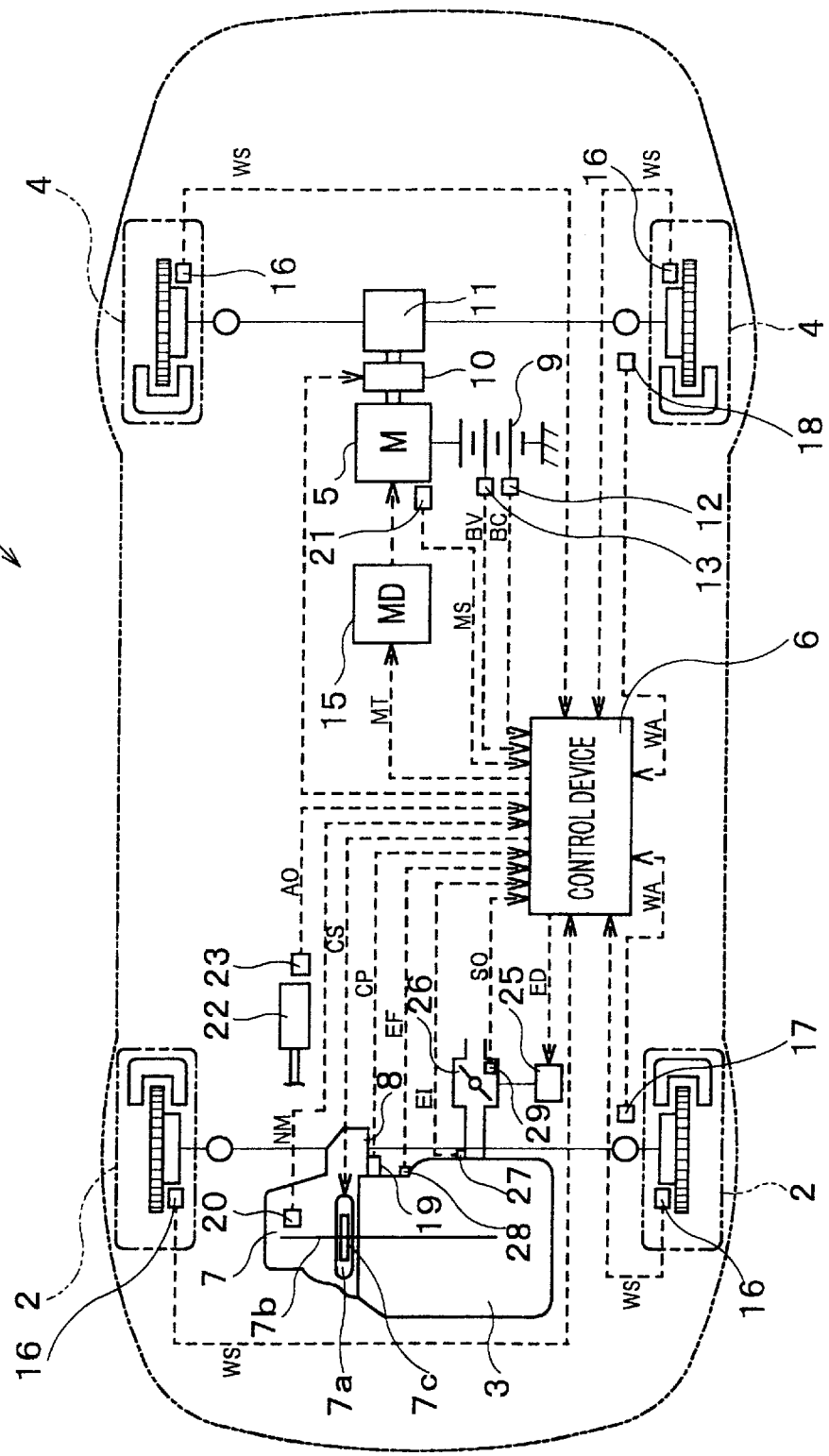
FIG. 1 is a schematic view of an overall structural view of a preferred embodiment of a front and rear wheel drive vehicle according to the present invention.

Now, a structural overview of the front and rear wheel drive vehicle 1 (hereinafter called as a vehicle) is described below in detail in conjunction with FIG. 1. FIG. 1 is an overall structural view of the front and rear wheel drive vehicle. In the illustrated embodiment, the front and rear wheel drive vehicle 1 refers to a front and rear wheel drive vehicle defined in appended claims.

The vehicle 1 has left and right front wheels 2, 2 which are driven with an engine 3, and left and right rear wheels 4, 4 which are driven with a motor 5. Further, in the vehicle 1, the control system 6 controls the engine 3 and the motor 5.

In the illustrated embodiment, also, the front wheels 2, 2 refer to one of front and rear wheel pairs defined in the appended claims. The rear wheels 4, 4 refer to the other one of the front and rear wheel pairs defined in the appended claims. The engine 3 refers to an engine defined in the appended claims. The motor 5 refers to an electric motor defined in the appended claims, and the control device 6 refers to a control device defined in the appended claims.

The engine 3 is laterally mounted on a front area of the vehicle 1. In addition, the engine 3 is coupled through an automatic power transmission 7, which includes a torque converter 7a, and a front differential 8 to the front wheels 2, 2 to drive the same. The torque converter 7a has a lock-up clutch 7c as a lock-up mechanism. The slip ratio of the torque converter 7a varies with the control of the engagement amount of the lock-up clutch 7c. Further, the engine 3 includes a throttle valve 26, which is connected through a DBW (Drive By Wire) driver 25 to the control device 6. Also, the drive power level of the engine 3 is settled by the control device 6, and on the basis of such drive power level, an opening degree of the throttle valve 26 is electronically controlled by the DBW driver 25. The DBW driver 25 includes a motor for varying the opening degree of the throttle valve 26.

In the illustrated embodiment, the torque converter 7a refers to a torque converter defined in the appended claims and the lock-up clutch 7c refers to a lock-up mechanism defined in the appended claims.

The motor 5 is mounted on a rear area of the vehicle 1. Further, the motor 5 is connected to a battery 9 which serves as a power supply. In addition, the motor 5 is coupled through an electromagnetic clutch 10 and a rear differential 11 to the rear wheels 4, 4 to drive the same. Also, the motor 5 is supplied with an electric power output of the battery 9, and in the case where the electromagnetic clutch 10 remains in a coupled state, the rear wheels 4, 4 are driven to maintain the vehicle 1 in a four-wheel drive state. On one hand, in the case that the motor 5 is driven with a running energy of the vehicle 1, the motor 5 functions as an electric power generator to recapture a regenerative power. Further, a current sensor 12 and a voltage sensor 13 are provided in the battery 9 to detect a battery current signal BC and a battery voltage signal BV, respectively, which are introduced to the control device 6. In this connection, the battery current signal BC and the battery voltage signal BV are used in the control device 6 to calculate a power remaining amount SOC of the battery 9.

Further, the motor 5 is coupled through a motor driver 15 to the control device 6. In addition, the control device 6 sets the drive power required during the four-wheel driving state and the charging power (negative drive power) during the regenerative power generating mode for the motor 5, based on which the motor driver 15 controls the motor 5. The motor driver 15 serves as a control unit for the motor 5 to perform control for electric current level, etc., of the motor 5. Furthermore, the control device 6 determines coupling or uncoupling state of the electromagnetic clutch 10 and controls supply or interruption of electric current to be supplied to a solenoid (not shown) of the electromagnetic clutch 10.

In order to control the engine 3 and the motor 5 with the control device 6, the vehicle 1 has various sensors to introduce various information items to the control device 6. To this end, wheel sensors 16, each of a magnetic flux pick-up type, are provided at the left and right front wheels 2, 2 and the left and right rear wheels 4, 4, respectively, to detect respective rotational speeds for producing respective wheel's rotational speed signals WS (also referred to as a "RPM signal"), each representing a train of pulse signals indicative of the rotational speed (also referred to as "RPM"), to be introduced to the control device 6. Further, acceleration sensors 17, 18 are provided at one of the left and right front wheels 2, 2 and at one of the left and right rear wheels 4, 4, respectively, to detect respective acceleration degrees of the front wheels 2, 2 and the rear wheels 4, 4 for producing acceleration signals WA which are introduced to the control device 6. Also, the acceleration sensors 17, 18 are composed of fore and aft G sensors (of a magnetostrictor type), which are mounted in a central area of the vehicle 1, respectively, for detecting acceleration levels in fore and aft directions of the vehicle such that the acceleration signals WA indicative of accelerations in the fore and aft directions of the vehicle detected by the acceleration sensors may be introduced to the control device 6 in order to accurately obtain the vehicle speed. In the control device 6, further, the wheel's RPM signals WS is used for calculating a wheel's speed, and the wheel's RPM signals WS and the acceleration signals WA are used for calculating a vehicle speed.

A crank angle sensor 19 is also mounted to a crankshaft (not shown) of the engine 3 to detect a crank angular position of the crankshaft, which is sent to the control device 6 as a crank pulse signal CP. Further, a main shaft RPM sensor 20 of a magnetic pick-up type is mounted to the main shaft 7b of the automatic power transmission 7. And a number of revolution signal NM of the main shaft, a pulse signal of the RPM of the main shaft 7b detected by the sensor 20, is sent to the control device 6. The crank pulse signal CP is used in the control device 6 to calculate an engine RPM signal NE. Further, the number of revolution signal NM of the main shaft is used in combination with the engine RPM signal NE in the control device 6 to calculate a slip ratio=NM/NE of the torque converter 7a.

In addition, a motor RPM sensor 21 of a resolver type is mounted to the motor 5, and a motor RPM signal MS, a pulse signal of the RPM value of the motor 5 detected by the sensor 21, is sent to the control device 6.

Further, an accelerator opening sensor 23 is coupled to an accelerator pedal 22. An accelerator opening signal AO, including ON/OFF status of the accelerator pedal 22 detected by the sensor 23, is sent to the control device 6.

An intake air amount sensor 27 is disposed at the engine 3 and an intake air amount signal EI detected by the sensor 27 is sent to the control device 6. In addition, a fuel injection amount sensor 28 is installed to the engine 3 and a fuel injection amount signal FE detected by the sensor 28 is sent to the control device 6. Also, a throttle opening degree sensor 29 is mounted on the throttle valve 26 and a throttle opening degree signal SO detected by the sensor 29 is sent to the control device 6.

The control device 6 is constructed of a microcomputer (not shown) composed of a RAM (Random Access Memory), a ROM (Read Only Memory), a CPU (Central Processing Unit) and I/O Interfaces, etc. The control device 6 controls the automatic power transmission 7 as well as the engine 3 and the motor 5. The control device 6 settles a target drive-power on the basis of the accelerator opening degree and the vehicle speed. Further, the control device 6 determines a drive-power distribution-ratio based on the three drive-power distribution-ratio data maps, settling the engine drive power and the motor drive power with thus determined drive-power distribution-ratio and the target drive power. Consequently, the control device 6 settles an engine drive signal ED on the basis of the engine drive-power and a motor-demanded-torque signal MT on the basis of the motor drive-power. Further, the control device 6 outputs the engine drive signal ED to the DBW driver 25 to control the opening degree of the throttle valve 26, thereby controlling the drive power output of the engine 3. Likewise, the control device 6 outputs the motor-demanded-torque signal MT to the motor driver 15, thereby controlling the drive power output of the motor 5.

The control device 6 makes an additional compensation to the target slip ratio of the torque converter 7a according to the motor drive power during the assistance by the drive power of the motor 5. The control device 6 gives a maximum additional compensation to the target slip ratio, avoiding the surging region and the booming noise region, which are governed by the number of engine revolutions and the engine torque. Then the control device 6 settles an engagement amount signal CS of the lock-up clutch 7c so that the slip ratio of the torque converter 7a meets the target slip ratio. Further, the control device 6 sends the engagement amount signal CS to the lock-up clutch 7c to control the engagement amount of the lock-up clutch 7c.

Figure 2:
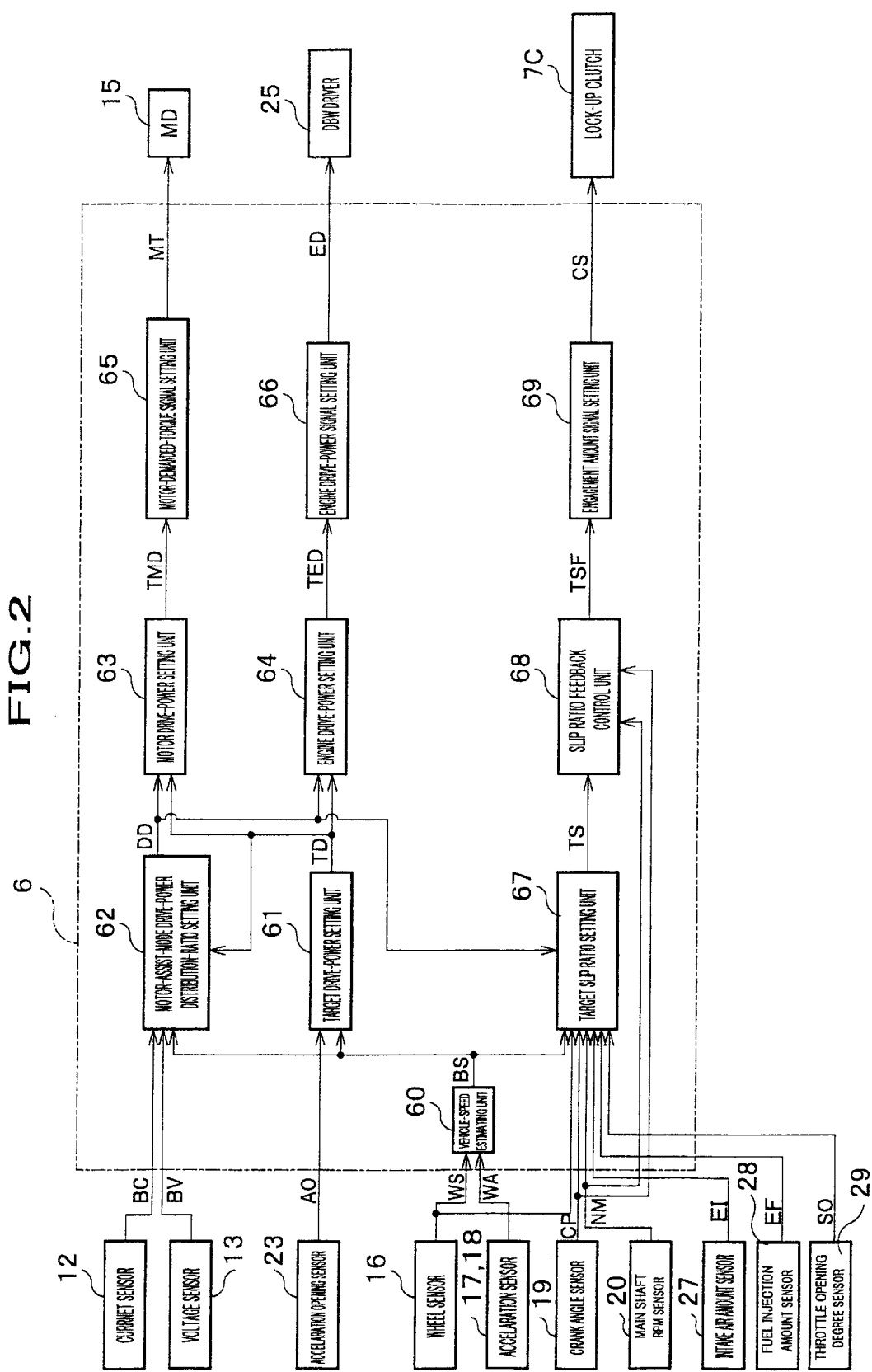
FIG. 2 is a block diagram of a control device of the front and rear wheel drive.

Now, an overview of the control device 6 is described below in detail in conjunction with FIG. 2. FIG. 2 shows a structural view of the control device 6 of the vehicle 1.

The control device 6 includes a vehicle-speed estimating unit 60, a target drive-power setting unit 61, a motor-assist-mode drive-power distribution-ratio setting unit 62, a motor drive-power setting unit 63, an engine drive-power setting unit 64, a motor-demanded-torque signal setting unit 65, an engine drive-power signal setting unit 66, a target slip ratio setting unit 67, a slip ratio feedback control unit 68 and an engagement amount signal setting unit 69 etc.

In the illustrated embodiment, further, the slip ratio feedback control unit 68 and the engagement amount signal setting unit 69 refer to a lock-up control means defined in the appended claims, the target drive-power setting unit 61, the motor-assist-mode drive-power distribution-ratio setting unit 62 and the motor drive-power setting unit 63 refer to a motor drive power setting means defined in the appended claims, and the target slip ratio setting unit 67 refers to a compensation means defined in the appended claims.

Initially, the vehicle-speed estimating unit 60 is described in detail. The vehicle-speed estimating unit 60, receiving the wheel's RPM signals WS from the wheel sensors 16 and the acceleration signals WA outputted by the acceleration sensors 17, 18, to generates and sends a vehicle speed signal BS to the target drive-power setting unit 61, the motor-assistmode drive-power distribution-ratio setting unit 62 and the target slip ratio setting unit 67. The vehicle-speed estimating unit 60 calculates the wheel speeds of the respective wheels 2, 2, 4, 4 on the basis of the wheel's RPM signals WS. Further, the vehicle-speed estimating unit 60 calculates the vehicle speed BS of the vehicle 1 on the basis of a history of the past vehicle speed, the wheel speeds and the acceleration signals WA etc.

Next, the target drive-power setting unit 61 is described below in detail. The target drive-power setting unit 61, receiving the acceleration opening degree signal AO from the acceleration opening degree sensor 23 and the vehicle speed BS from the vehicle-speed estimating unit 60, generates and sends a target drive power TD to the motor-assist-mode drive-power distribution-ratio setting unit 62, the motor drive-power setting unit 63 and the engine drive-power setting unit 64. The target drive power TD means what the vehicle 1 requires, which is generated by the engine 3 and the motor 5. In this connection, when the motor 5 functions as a generator, the target drive power TD is generated only by the engine 3. In this case, the engine 3 also produces the running energy consumed by the motor 5.

The target drive-power setting unit 61 includes a memory unit such as ROM etc. that stores a table, which gives the relation of the vehicle speed BS, the accelerator opening signal AO and the target drive-power TD and is predetermined with experimental results or designed values. Further, the table is provided such that the larger the opening degree of the accelerator opening, the larger will be the target drive-power and the higher the vehicle speed, the smaller will be the target drive-power. When the vehicle 1 is in a non-slipping condition, the target drive-power setting unit 61 reads out the target drive-power TD with the vehicle speed BS and the accelerator opening signal AO as address. On the other hand, when the vehicle is in a slipping condition, the target drive-power setting unit 61 calculates a road-surface-frictional-coefficient estimated value (with the frictional-coefficient hereinafter referred to as "$\mu$") on the basis of the slip ratios of the respective wheels 2, 2, 4, 4. Also, the target drive-power setting unit 61 calculates a drive power to be transmitted to a road surface during the slipping operation on the basis of the total weight of the vehicle land the road-surface $\mu$-estimated value, assigning thus calculated drive power as the target drive power TD. The slip ratios of the respective wheels 2, 2, 4, 4 are determined based on the vehicle speed BS and the wheel speed. What is calculated by the vehicle-speed estimating unit 60 is used as the wheel speed. Whether or not the vehicle is in a slipping condition is determined with the slip ratios of the respective wheels 2, 2, 4, 4.

Next, the motor-assist-mode drive-power distribution-ratio setting unit 62 is described below in detail. The motor-assist-mode drive-power distribution-ratio setting unit 62, receiving the battery current signal BC from the current sensor 12, the battery voltage signal BV from the voltage sensor 13, the vehicle speed BS from the vehicle-speed estimating unit 60 and the target drive power TD from the target drive-power setting unit 61, generates and sends a drive power distribution ratio DD to the motor drive-power setting unit 63, the engine drive-power setting unit 64 and the target slip ratio setting unit 67. Therefore, the motor-assist-mode drive-power distribution-ratio setting unit 62 includes a memory unit such as ROM etc., that stores a drive-power distribution ratio map for fuel efficiency-mode, a drive-power distribution ratio map for low $\mu$ road running mode and a drive-power distribution ratio map for forced battery charge mode, which are predetermined based on experimental results or designed values. The drive-power distribution ratio map for fuel efficiency-mode is for distributing the drive power to drive the engine efficiently. The drive-power distribution ratio map for low $\mu$ road running mode is for distributing the drive power within the limit of drive power to be transmitted to a road surface from each wheel in order to prevent the wheels from slipping. And the drive-power distribution ratio map for forced battery charge mode is for distributing the engine drive power and the motor charge power within the limit of the engine drive power.

The motor-assist-mode drive-power distribution-ratio setting unit 62 calculates a power remaining capacity level of the battery SOC based on the battery current signal BC and the battery voltage signal BV. When the power remaining capacity level of the battery SOC is less than the minimum power remaining capacity level, the motor-assist-mode drive-power distribution-ratio setting unit 62 will select a drive power distribution ratio DD from the drive-power distribution ratio map for the forced battery charge mode based on the vehicle speed BS and the target drive power TD. On the other hand, when the power remaining capacity level of the battery SOC is not less than the minimum power remaining capacity level, the motor-assist-mode drive-power distribution-ratio setting unit 62 will determine whether or not the vehicle is on a low $\mu$ road. In the case of low $\mu$ road, the motor-assist-mode drive-power distribution-ratio setting unit 62 will select a drive power distribution ratio DD from the drive-power distribution ratio map for low $\mu$ road running mode based on the vehicle speed BS and the target drive power TD. Not in the case of low $\mu$ road, the motor-assist-mode drive-power distribution-ratio setting unit 62 will select a drive power distribution ratio DD from the drive-power distribution ratio map for fuel efficiency-mode based on the vehicle speed BS and the target drive power TD. The road-surface $\mu$-estimated value is the same as that calculated by the target drive-power setting unit 61.

Next, the motor drive-power setting unit 63 is described below in detail. The motor drive-power setting unit 63, receiving the target drive TD from the target drive-power setting unit 61 and the drive-power distribution ratio DD from the motor-assist-mode drive-power distribution-ratio setting unit 62, generates and sends a motor drive-power TMD to the motor-demanded-torque signal setting unit 65. The motor drive-power setting unit 63 calculates the motor drive-power TMD on the basis of the received drive-power distribution-ratio DD and the target drive-power TD. Also, the motor drive-power TMD becomes negative value when the motor 5 serves as a generator, being converted into the motor generating power.

Next, the engine drive-power setting unit 64 is described below in detail. The engine drive-power setting unit 64, receiving the target drive-power TD from the target drive-power setting unit 61 and the drive-power distribution-ratio DD from the motor-assist-mode drive-power distribution-ratio setting unit 62, generates and sends an engine drive-power TED to the engine drive-power signal setting unit 66. The engine drive-power setting unit 64 calculates the engine drive power TED on the basis of the received drive-power distribution-ratio DD and the target drive power TD.

Next, the motor-demanded-torque signal setting unit 65 is described below in detail. The motor-demanded-torque signal setting unit 65, receiving the motor drive signal TMD from the motor drive-power setting unit 63, generates and sends the motor-demanded-torque signal MT to the motor driver 15. The motor-demanded-torque signal setting unit 65 settles the RPM and rotational direction of the motor 5 on the basis of the motor drive-power signal TMD. Further, on the basis of the RPM and rotational direction of the motor 5, the motor-demanded-torque signal setting unit 65 sets the motor-demanded-torque signal MT that controls the motor driver 15.

Next, the engine drive-power signal setting unit 66 is described below in detail. The engine drive-power signal setting unit 66, receiving the engine drive power TED from the engine drive-power setting unit 64, generates and sends the engine drive power signal ED to the DBW driver 25. The engine drive-power signal setting unit 66 calculates the opening degree of the throttle valve 26 based on the engine drive power TED. Further, based on thus calculated opening degree, the engine drive-power signal setting unit 66 settles the number of motor revolutions and motor rotating direction of the DBW driver 25, which are used as the engine drive signal ED.

Figure 3:
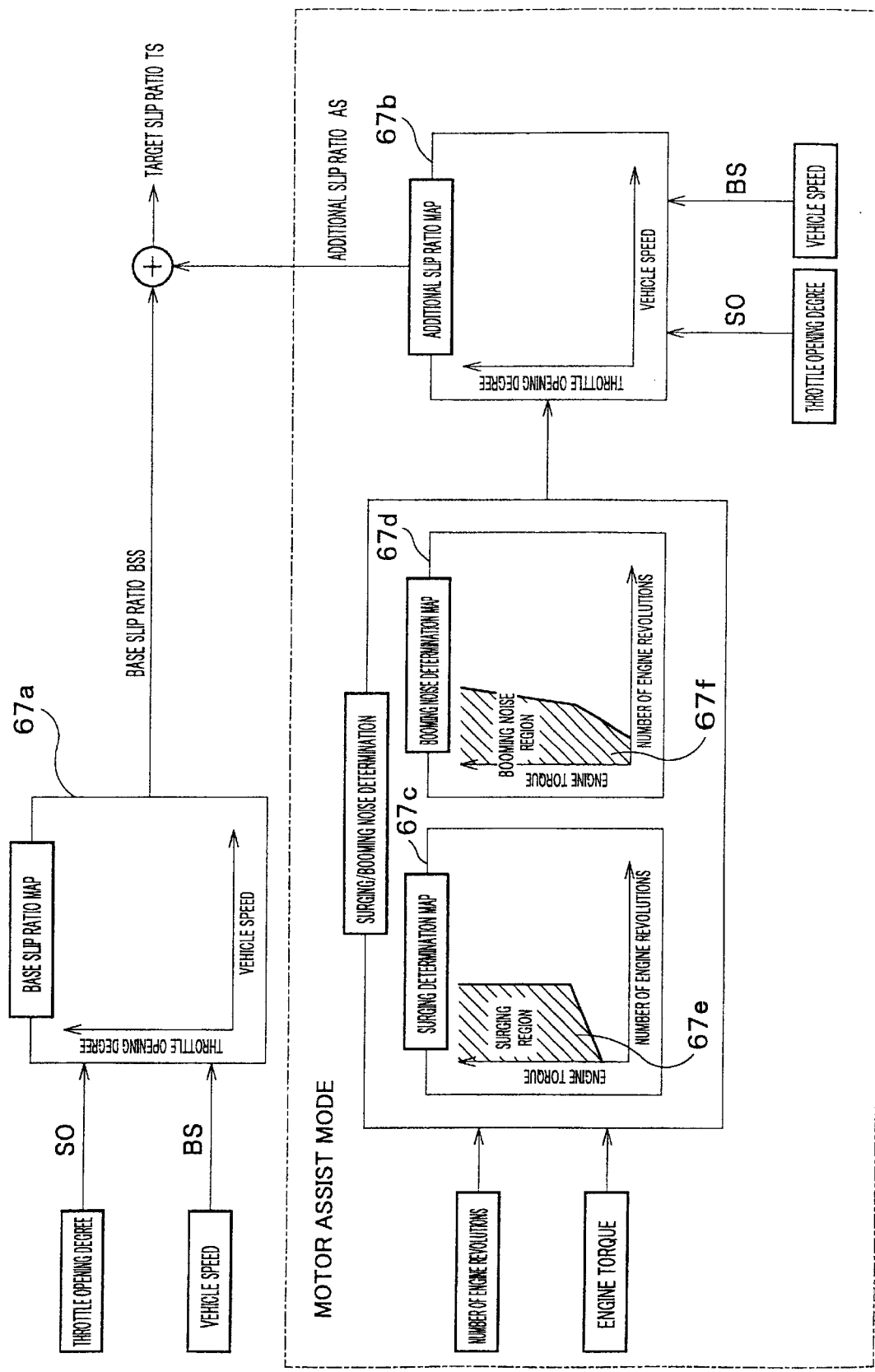
FIG. 3 is a view for illustrating a method of setting target slip ratio to be employed in a target slip ratio setting unit shown in FIG. 2.

Now, the target slip ratio setting unit 67 will be described below in detail in conjunction with FIG. 3. FIG. 3 is a view for illustrating a method of setting the target slip ratio in the target slip ratio setting unit 67. The target slip ratio setting unit 67, receiving the crank pulse signal CP from the crank angle sensor 19, the number of revolution signal of main shaft NM from the main shaft rotation sensor 20, the intake air amount signal E1 from the intake air amount sensor 27, the fuel injection amount signal EF from teh fuel injection amount sensor 28, the throttle opening degree signal SO from the throttle opening degree sensor 29, the vehicle speed BS from the vehicle-speed estimating unit 60 and the drive power distribution ratio DD from the motor-assist-mode drive-power distribution-ratio setting unit 62, generates and sends the target slip ratio TS to the slip ratio feedback control unit 68. For this reason, the target slip setting unit 67 includes a memory unit such as ROM etc., that stores a base slip ratio map 67a, an additional slip ratio map 67b, a surging determination map 67c and a booming noise determination map 67d, which are predetermined based on experimental results or designed values.

The target slip setting unit 67 selects a base slip ratio BSS from the base slip ratio map 67a based on the throttle opening degree signal SO and the vehicle speed BS first. The base slip ratio map 67a gives a map, which shows an allowable slip ratio of the torque converter 7a considering the vibration and noise of the engine 3, which are estimated with the vehicle speed and the throttle opening degree. Therefore, the base slip ratio map 67a is provided according to the characteristics of the engine 3 and the torque converter 7a etc. The base slip ratio BSS is set to be relatively small so that the vibration of the engine 3 may not be transferred to the vehicle 1, in preparation for such a case that the torque is amplified by the torque converter 7a for the driving power of the engine 3. For example, the base slip ratio BSS is set in the range of between 70% and 100%.

The target slip setting unit 67 makes a filtering of the base slip ratio BSS. It will restrain the variation induced by the base slip ratio BSS if the actual slip ratio of the torque converter 7a obtained by the sensor signal largely differs from the base slip ratio BSS. This is for avoiding the shock, which is caused by a sudden change in the engagement amount of the lock-up clutch 7c. Whereas, the target slip setting unit 67 calculates an actual slip ratio of the torque converter 7a based on the crank pulse signal CP and the number of revolution signal of main shaft NM.

Consequently, the target slip setting unit 67 determines whether or not in an assist mode by the drive power of the motor 5 on the basis of the drive power distribution ratio DD. In the case of the motor assist mode, the target slip setting unit 67 settles the target slip ratio TS by making an additional compensation to the base slip ratio BSS. On the contrary, when not in the motor assist mode, the target slip setting unit 67 sets the base slip ratio BSS as a target slip ratio TS. This is because the drive power of the engine 3 reduces as much as the drive power assisted by the motor 5 in the motor assist mode. Especially, the torque is amplified for the drive power of the engine 3 by the torque converter 7a at a starting of the vehicle. However, the torque is not amplified in the case of the motor assist mode. Therefore, increasing the slip ratio of the torque converter 7a to the maximum, the transmission loss of the torque converter 7a is reduced during the motor assist mode when the vibration and noise caused by the engine 3 decrease.

Now the additional compensation during the motor assist mode will be described in detail. The additional compensation of the motor assist mode is repeatedly carried out to increase the target slip ratio TS gradually. The upper limit for the additional compensation is defined in order to avoid the driving region of the engine 3, in which the vehicle vibration caused by the surging and the booming noise occur. In other words, during the motor assist mode, the transmission loss by the slip of the torque converter 7a is reduced by raising the slip ratio of the torque converter 7a up to the surging limit and the booming noise limit.

First, the target slip setting unit 67 determines whether or not the relation between the number of engine revolutions and the engine torque falls in a surging region 67e (hatched area) of the surging determination map 67c. If it does not fall in the surging region 67e, the target slip setting unit 67 starts a determination with the booming noise determination map 67d. On the contrary, if it falls in the surging region 67e, the target slip setting unit 67 terminates the additional compensation with the additional slip ratio map 67b. The surging determination map 67c is a map, which depicts graphically the surging region of the engine 3 estimated with the number of engine revolutions and the engine torque. That is why the surging determination map 67c is provided according to the characteristics of the engine 3. The target slip setting unit 67 calculates the number of engine revolutions with the crank pulse signal CP as well as it calculates the engine torque with the number of engine revolutions, the intake air amount signal EI, the fuel injection amount signal EF and the throttle opening degree signal SO etc. By the way, the engine torque means what is created by the engine drive power, which is reduced as much as the motor drive power assisted by the motor 5.

Next, the target slip setting unit 67 determines whether or not the relation between the number of engine revolutions and the engine torque falls in the booming noise region 67f (hatched are) of the booming noise determination map 67d. If it does not fall in the booming noise region 67f, the target slip setting unit 67 moves to start an additional compensation with the additional slip ratio map 67b. On the contrary, if it falls in the booming noise region 67f, the target slip setting unit 67 terminates the additional compensation with the additional slip ratio map 67b. The booming noise determination map 67d is a map, which graphically depicts the booming noise region of the engine 3 estimated with the number of engine revolutions and the engine torque. Therefore the noise booming determination map 67d is provided according to the characteristics of the engine 3. The number of engine revolutions and the engine torque used as parameters are the same as those for the surging determination.

Subsequently, when the relation between the number of engine revolutions and the engine torque falls in neither the surging region 67e nor the booming noise region 67f, the target slip setting unit 67 selects an additional slip ratio AS from the additional slip ratio map 67b based on the throttle opening degree signal SO and the vehicle speed BS. The additional slip ratio map 67b is a map, which shows the possible slip ratio of the torque converter 7a to be added when the vibration and noise etc. of the engine 3 estimated with the vehicle speed and the throttle opening degree are taken into account. Therefore, the additional slip ratio map 67b is prepared according to the characteristics of the engine 3 and the torque converter 7a etc. For instance, the additional slip ratio AS is set in the range of between 1% and 2%. By the way, the throttle opening degree signal SO means what is detected to provide the engine drive power that is reduced as much as the motor drive power assisted by the motor 5.

Finally, the target slip setting unit 67 makes a summation of the base slip ratio BSS and the additional slip ratio AS, setting the target slip ratio TS. In this additional compensation, the engine torque used for the surging determination and the booming noise determination and the throttle opening degree signal SO used for the selection of the additional slip ratio AS are obtained according to the engine drive power, which is determined by the assisted motor drive power. Consequently, the additionally compensated target slip ratio TS is representative of the motor drive power.

Next the slip ratio feedback control unit 68 will be described in detail. The slip ratio feedback control unit 68, receiving the crank pulse signal CP from the crank angle sensor 19, the number of revolution signal NM of the main shaft from the main shaft revolution sensor 20 and the target slip ratio TS from the target slip ratio setting unit, generates and sends the target slip ratio feedback control amount TSF to the engagement amount signal setting unit 69. The slip ratio feedback control unit 68 calculates an actual slip ratio of the torque converter 7a of the vehicle 1 with the crank pulse signal CP and the number of revolution signal NM of the main shaft. Then the slip ratio feedback control unit 68 subtracts the actual slip ratio from the target slip ratio to produce the target slip ratio feedback control amount TSF.

Next the engagement amount signal setting unit 69 will be described in detail. The engagement amount signal setting unit 69, receiving a target slip ratio feedback control amount TSF from the slip ratio feedback control unit 68, generates and sends the engagement amount signal CS to the lock-up clutch 7c. The engagement amount signal setting unit 69 calculates an increment/decrement for the engagement of the lock-up clutch with the target slip ratio feedback control amount TSF. With thus acquired increment/decrement, the engagement amount signal setting unit 69 determines the engagement amount signal CS which controls the lock-up clutch.

Figure 4:
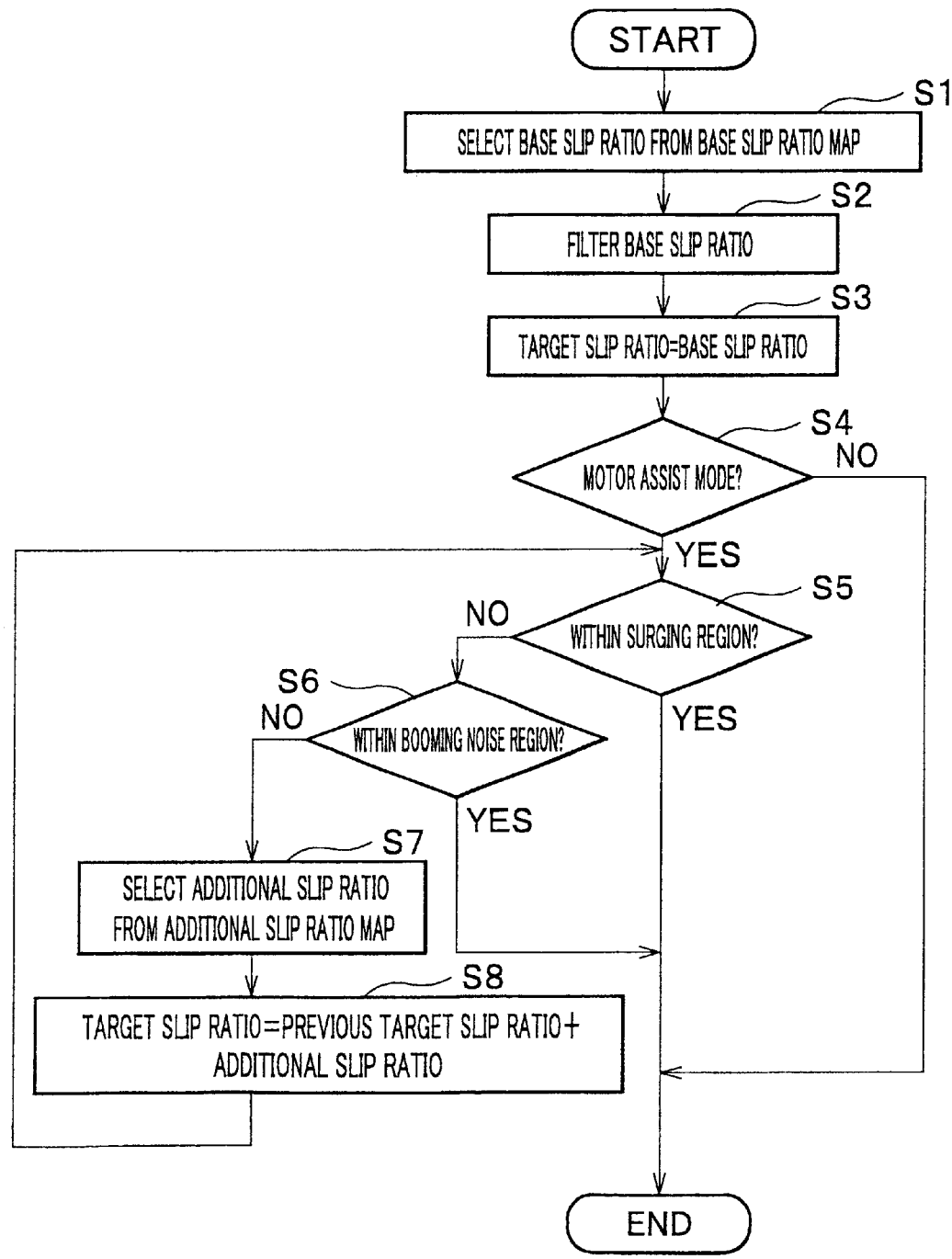
FIG. 4 is a flow diagram illustrating a method of setting a target slip ratio employed in a target slip ratio setting unit shown in FIG. 2.

Finally, the control unit 6 will be described in detail in conjunction with FIG. 1 or FIG. 3. The function of the target slip ratio setting unit 67 will be explained with the flow diagram for setting the target slip ratio shown in FIG. 4.

The control unit 6 takes into the values detected by various types of sensors as signal such as 12, 13, 16, 17, 18, 19, 20, 23, 27, 28 and 29 etc., which are mounted on the vehicle 1. The vehicle-speed estimating unit 60 calculates the vehicle speed BS with the respective wheel's rotational speed signals WS and the acceleration signals WA.

The target drive-power setting unit 61 determines the target drive power TD with the accelerator opening signal AO and the vehicle speed BS. When the vehicle 1 is in a slipping condition, the target drive-power setting unit 61 sets a transmission drive power, which is appropriate for the slipping condition, for the target drive power TD.

The motor-assist-mode drive-power distribution-ratio setting unit 62 calculates the power remaining amount SOC of the battery with the battery current signal BC and the battery voltage signal BV. And the motor-assist-mode drive-power distribution-ratio setting unit 62 selects one of the three drive-power distribution ratio maps for fuel efficiency-mode, low $\mu$ road running mode and forced battery charge mode, with the power remaining amount SOC of the battery and the road-surface $\mu$-estimated value, thereby setting the drive power distribution ratio DD.

The motor drive-power setting unit 63 calculates the motor drive power TMD with the drive power distribution ratio DD and the target drive power TD. And the engine drive-power setting unit 64 calculates the engine drive power TED with the drive power distribution ratio DD and the target drive power TD.

Next the motor-demanded-torque signal setting unit 65 determines the motor-demanded-torque signal MT with the motor drive power TMD, sending the motor-demanded-torque signal MT to the motor driver 15. While, the engine drive-power signal setting unit 66 determines the engine drive signal ED with the engine drive power TED, sending the engine drive signal ED to the DBW driver 25.

Then the motor driver 15 regulates the number of revolutions and the rotational direction of the motor 5 with the motor-demanded-torque signal MT, thereby controlling the drive power of the motor 5. Also the motor driver 15 controls the motor 5 with the motor-demanded-torque signal MT, thus controlling the charge by the motor 5. On the other hand the DBW driver 25 regulates the opening degree of the throttle valve 26 with the drive signal ED, controlling the drive power of the engine 3.

The target slip ratio setting unit 67 of the control device 6 selects the base slip ratio BSS from the base slip ratio map 67a with the throttle opening degree signal SO and the vehicle speed BS (S1).

Next the target slip ratio setting unit 67 filters the base slip ratio BSS (S2).

Subsequently, the target slip ratio setting unit 67 defines the base slip ratio BSS as the target slip ratio TS (S3).

The target slip ratio setting unit 67 determines with the drive power distribution ratio DD whether or not the drive power of the motor 5 is assisting (S4) When not in a motor assist mode, the target slip ratio setting unit 67 terminates the process.

On the other hand in the case of motor assist mode, the target slip ratio setting unit 67 calculates the number of engine revolutions with the crank pulse signal CP as well as it calculates the engine torque with the number of engine revolutions, the intake air amount signal EI, the fuel injection amount signal EF and the throttle opening degree signal SO etc. And the target slip ratio setting unit 67 determines where the relation between the number of engine revolution and the engine torque is located, inside or outside of the surging region 67e of the surging determination map 67c (S5).

When it is in the surging region 67e, the target slip ratio setting unit 67 terminates the process. On the other hand when it is not in the surging region 67a, the target slip ratio setting unit 67 determines where the relation between the number of engine revolutions and the engine torque is located, inside or outside of the booming noise region 67f of the booming noise determination map 67d (S6).

When it is in the booming noise region 67f, the target slip ratio setting unit 67 terminates the process. On the other hand when it is not in the booming noise region 67f, the target slip ratio setting unit 67 selects the additional slip ratio AS from the additional slip ratio map 67b with the throttle opening degree signal SO and the vehicle speed BS (S7).

Subsequently the target slip ratio setting unit 67 makes a summation of the previously set target slip ratio TS and the additional slip ratio AS, generating a new target slip ratio TS and then goes back to the process of step 5 (S8). It means that the selection of the additional slip ratio AS will be continued as long as the relation between the number of engine revolutions and the engine torque falls in neither the surging region 67e nor the booming noise region 67f. Each time an additional slip ratio AS is selected, thus selected additional slip ratio AS will be added to the previously set target slip ratio TS at the process of step S8. It follows that the maximum additional compensation will be made to the target slip ratio TS as long as the driving region of the engine 3 (driving region associated with the number of engine revolutions and engine torque) falls in neither the surging region 67e nor the booming noise region 67f. In other words, the additional compensation for the target slip ratio TS is determined so that the driving region of the engine 3 falls in neither the surging region 67e nor the booming noise region 67f. The target slip ratio TS can be the maximum of 100%.

The target slip ratio setting unit 67 sends the updated target slip ratio TS to the slip ratio feedback control unit 68 each time the updating is carried out. Therefore, a new target slip ratio TS is sent to the slip ratio feedback control unit 68 for each selection of the additional slip ratio AS during the motor assist mode.

Next the slip ratio feedback control unit 68 calculates the actual slip ratio of the torque converter 7a of the vehicle 1 with the crank pulse signal CP and the number of revolution signal NM of the main shaft. The slip ratio feedback control unit 68 subtracts the actual slip ratio from the latest target slip ratio TS that has been defined in the target slip ratio setting unit 67, the result of which is set to be the target slip ratio feedback control amount TSF and sent to the engagement amount signal setting unit 69.

Finally, the engagement amount signal setting unit 69 calculates an increment/decrement for the engagement of the lock-up clutch 7c with the target slip ratio feedback control amount TSF. With thus acquired increment/decrement, the engagement amount signal setting unit 69 determines the engagement amount signal CS which controls the lock-up clutch 7c and sends it to the lock-up clutch 7c.

The engagement amount of the clutch is adjusted with the engagement amount signal CS for the lock-up clutch 7c so that the slip ratio of the torque converter 7a is the target slip ratio TS.

With such a control device 6, the target slip ratio setting unit 67 gives the additional compensation to the target slip ratio TS during the motor assist mode, increasing the slip ratio of the torque converter 7a. Consequently, the power transmission loss of the torque converter 7a is reduced, accompanied by the reduction in the output loss of the engine 3, thereby resulting in the improvement of fuel efficiency. Further, the control device 6 solves the surging and the booming noise of the engine 3 because the target slip ratio setting unit 67 makes the additional compensation to the target slip ratio avoiding the driving region where the surging and booming noise of the engine 3 occur.

It will now be appreciated from the foregoing description that the present invention is not limited to the particular illustrated embodiment discussed above and may be carried out in various modified forms.

For example, although the base slip ratio map and the additional slip ratio map have been discussed as the function of the parameter of the throttle opening degree of the sensor signal, other parameters determined by the control device such as the target drive power, the engine drive power and the motor drive power etc. may be alternatively selected.

Although the base slip ratio map and the additional slip ratio map have been discussed as the function of the parameter of the throttle opening degree of the sensor signal, other parameters such as the engine torque etc. determined with the various sensor signals may also be alternatively selected.

Also, although the surging determination map and the booming noise determination map have been discussed as the function of the parameter of the engine torque, other parameters such as the throttle opening degree etc. may be selected.

Also, although the additional compensation has been discussed to be performed within the driving region avoiding the surging and the booming noise caused by the engine, another compensation may be carried out so as to avoid other driving areas with the NV problems.

Also, although the control device has been discussed as one component, it may be separately comprised like a control device dedicated for the engine, a control device dedicated for the motor and a control device dedicated for the automatic transmitter etc.

Also, although the drive power distribution ratio has been discussed to be determined with the respective maps for 3 modes of the drive power distribution ratio, it may be determined with the loads of front and rear wheels with regard to the inclination of the road.

What is claimed is:

1. A control device for a front and rear wheel drive vehicle, in which one of front rear wheel pairs is driven with an engine and the other one of front and rear wheel pairs is driven with an electrical motor, and a torque converter with a lock-up mechanism capable of controlling an engagement amount is disposed between said engine and said one of wheel pairs, the control device comprising:

a lock-up control means foil controlling said lock-up mechanism so that a target slip amount is set in accordance with driving conditions of said front and rear wheel drive vehicle;

a motor drive power setting means which sets the drive power distribution ratio of said motor, wherein the motor drive power setting means further comprises a target drive-power setting unit, a drive-power distribution ratio setting unit, and a motor drive-power setting unit;

a compensation means which compensates said target slip amount according to the drive power distribution ratio of said motor set by said motor drive power setting means;

wherein the compensation means further comprises a target slip ratio setting unit.

2. The control device for a front and rear wheel drive vehicle according to claim 1, wherein said target slip amount is controlled so that the number of revolutions and drive power of said engine do not fall in a certain operational region of said engine.

* * * * *